W. H. BRISTOL.
MEASURING INSTRUMENT.
APPLICATION FILED OCT. 2, 1913.

1,106,341.

Patented Aug. 4, 1914.

Witnesses:
John E. Prager
A. Worden Gibbs

Inventor
William H. Bristol
By his Attorney
Fredk. F. Schuck

UNITED STATES PATENT OFFICE.

WILLIAM H. BRISTOL, OF WATERBURY, CONNECTICUT, ASSIGNOR TO THE BRISTOL COMPANY, OF WATERBURY, CONNECTICUT, A CORPORATION OF CONNECTICUT.

MEASURING INSTRUMENT.

1,106,341.

Specification of Letters Patent. Patented Aug. 4, 1914.

Application filed October 2, 1913. Serial No. 792,924.

*To all whom it may concern:*

Be it known that I, WILLIAM H. BRISTOL, a citizen of the United States, and a resident of Waterbury, in the county of New Haven and State of Connecticut, have invented certain new and useful Improvements in Measuring Instruments, of which the following is a specification.

The invention relates to measuring instruments in which a small motion of an actuated member is to be multiplied for indicating or recording purposes, for example, and as one embodiment of the invention, to apparatus for measuring variation of pressure, more particularly through the effect of a difference of pressure upon an expansible member or casing.

It has for its object to afford a simple, compact, dead-beat instrument, which, though extremely accurate and sensitive for ranges of low as well as high pressures, is so constructed as to be able to withstand severe treatment without loss of accuracy of indication.

It has for a further object to dispense with all complicated multiplying mechanism for the indicating arm or pointer, to eliminate back lash thereof, and to construct the apparatus of simple and inexpensive parts which may be economically assembled.

To this end, the invention consists in certain features of construction more particularly described hereinafter, and shown in the accompanying drawing, in which—

Figure 1:
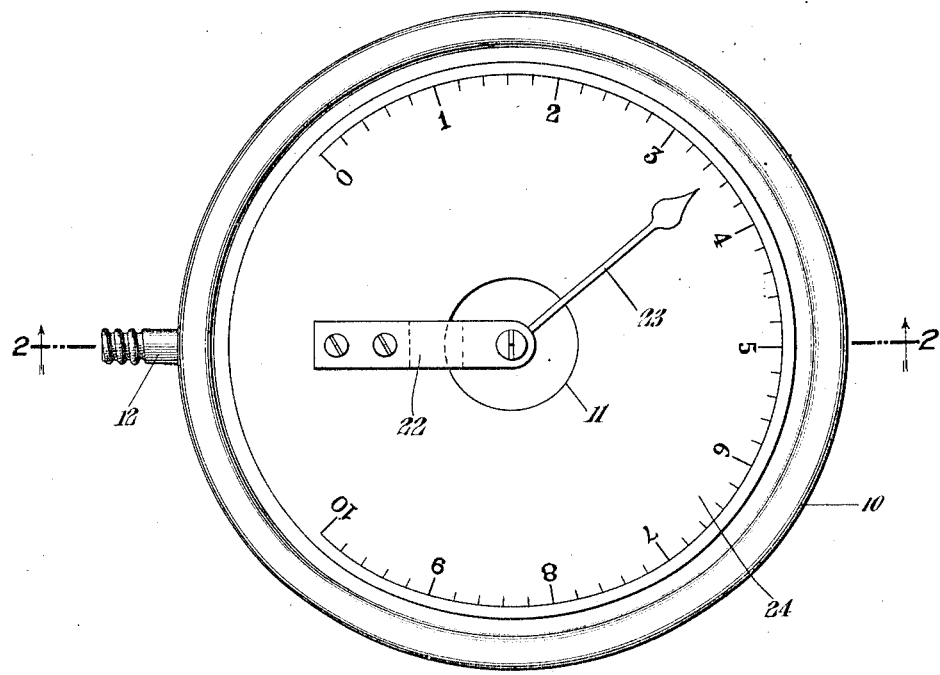
Figure 2:
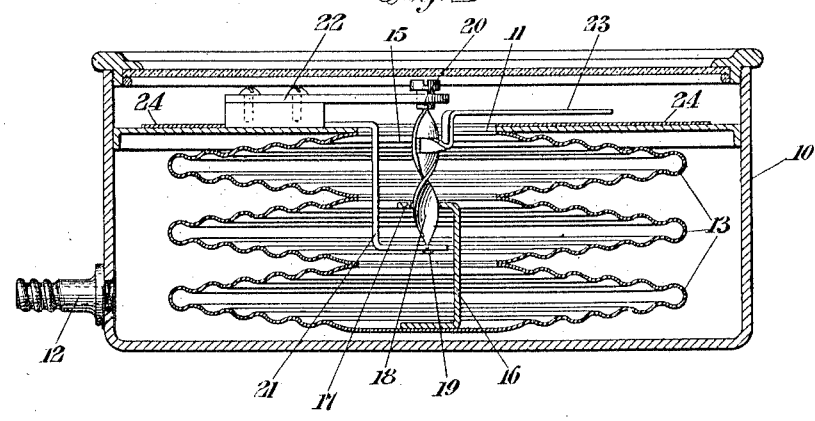

Figure 1 is a plan view of an indicating pressure gage embodying the invention. Fig. 2 is a vertical section thereof taken on the line 2—2, Fig. 1.

Similar characters of reference designate corresponding parts throughout the several views.

Referring to the drawings, 10 designates a suitable casing for the instrument, and is provided with a central circular opening 11 and an inlet 12 through which latter the fluid whose pressure it is desired to measure may be introduced. Centrally disposed within this casing is an expansible member preferably consisting of one or more flexible diaphragms 13. As shown, a plurality of the said diaphragms are secured to one another and the outer end of the series fixedly secured to the top of the casing 10 so that the said entire series in effect hangs therefrom, the inner end remaining free to move under variation of pressure thereon. Furthermore, the diaphragms with the exception of the innermost one are centrally perforated to provide a centrally disposed cylindrical opening 15 therethrough and registering with the opening 11 aforesaid.

To the free end of the series of diaphragms is fixedly secured a strip or bar 16, of sufficiently rigid material, extending outwardly in the opening 15 for a portion of its length and then turned over at right angles thereto. This strip 16 thus partakes of any motion of the diaphragm; and the turned over portion thereof is provided with a narrow slot 17 through which is adapted to pass a spiral member 18 preferably of a flat strip of metal twisted to the desired pitch and having its ends pointed. The said member 18 is mounted to turn about the longitudinal axis of the diaphragms in suitable bearings 19 and 20 provided to receive its pointed ends, the former bearing being held in a bracket 21 extending inwardly from the outer face of casing 10 into the cylindrical opening 15 at a distance sufficiently below the turned over portion of strip 16 to insure the free action of the diaphragms. The other bearing 20 is retained by an arm 22 extending from the outer face of the casing 10 over the opening 11.

A suitable indicating arm or pointer 23 is attached to the spiral member 18 near its outer end and is adapted to travel over a suitably graduated dial 24 upon the outer face of the casing 10. It is to be understood, of course, that although the invention is herein shown as applied specifically to an indicating pressure gage, that it is equally applicable to a recording gage. It will be readily understood, moreover, that as the diaphragms move inwardly and outwardly under the influence of the difference of pressure exerted thereon by the introduced fluid, and which may be applied within the diaphragms, if desired, instead of outside as herein shown, that the strip 16 will acquire a similar motion. The slot 17 thereof, in engaging the spiral member 18, will therefore effect a rotary movement of the latter which is communicated to its attached pointer 23. This in turn will serve as a measure of the applied pressure, by which term is also to be understood pressures below atmospheric pressure. In case of a fluid expansible under variation of temperature and retained in the casing 10, inlet 12 is of course unnecessary, and the variation of the volume of the fluid will serve as a measure of the temperature due to the pressure effect thereof upon the diaphragms.

The instrument thus constructed is composed of but few, simple and accessible parts which may be readily and economically produced, will be dead-beat in its indication and sufficiently rigid to withstand a reasonable amount of rough treatment. Furthermore, by reducing the number of diaphragms, an apparatus may be obtained which is unusually thin, a feature extremely desirable in many instances. Moreover, by providing a spiral member of varying pitch, the indications need not be uniform for equal increments of pressure.

I claim:—

1. A pressure gage, comprising: a suitably perforated casing; a plurality of perforated diaphragms forming an expansible member adapted to vary in length under pressure variations, the perforations of said diaphragms registering with that of said casing and one end of said expansible member being free to move; a member secured to the said free end of the expansible member and extending into the perforations of the diaphragms; a spiral member within the perforations of said diaphragms and engaged by said member extending from the free end of the diaphragms to be oscillated thereby; suitable bearing members for the spiral member and secured to said casing; and a measuring arm attached to said spiral member to move over the said casing as the expansible member varies in length.

2. A pressure gage, comprising: a suitable casing centrally perforated; a plurality of perforated expansible diaphragms, the perforations thereof registering with that of said casing and one end of said diaphragms being fixedly attached to said casing forming therewith a sealed chamber; a suitable inlet thereto for fluid under pressure; a slotted member secured to the free end of said diaphragms and extending into the perforations thereof; a spiral member engaged by the slot of said slotted member; a bracket extending inwardly from said casing into the perforations of said diaphragms and providing a bearing for the spiral member; an arm extending over said casing and providing a second bearing for said spiral member; and an indicating arm attached to said spiral member adapted to move over the said casing as the length of said expansible chamber is varied.

Signed at New York, in the county of New York, and State of New York, this 30th day of Sept., A. D. 1913.

WILLIAM H. BRISTOL.

Witnesses:
 FRED'K F. SCHNETZ,
 HELEN DE MOYA.